United States Patent
Sakata (10) Patent No.: US 8,222,790 B2
(45) Date of Patent: Jul. 17, 2012

(54) MOTOR STATOR, MOTOR AND ELECTRIC PUMP UNIT

(75) Inventor: Takatoshi Sakata, Yamatotakada (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 604 days.

(21) Appl. No.: 12/311,213

(22) PCT Filed: Oct. 2, 2007

(86) PCT No.: PCT/JP2007/069263
§ 371 (c)(1),
(2), (4) Date: Mar. 23, 2009

(87) PCT Pub. No.: WO2008/047594
PCT Pub. Date: Apr. 24, 2008

(65) Prior Publication Data
US 2010/0026117 A1 Feb. 4, 2010

(30) Foreign Application Priority Data
Oct. 3, 2006 (JP) .................... 2006-271860

(51) Int. Cl.
*H02K 3/48* (2006.01)

(52) U.S. Cl. ... 310/214; 310/215; 310/85; 310/216.069; 310/216.071; 310/216.072; 310/216.073

(58) Field of Classification Search ............. 310/215, 310/214, 85, 216.069, 216.071, 216.072, 310/216.073
See application file for complete search history.

(56) References Cited

U.S. PATENT DOCUMENTS

| 4,341,969 | A  | * | 7/1982  | Sievert ................... 310/154.21 |
| 4,799,564 | A  | * | 1/1989  | Iijima et al. .............. 180/65.51 |
| 5,858,857 | A  | * | 1/1999  | Ho ............................. 438/424 |
| 6,633,102 | B2 | * | 10/2003 | Nagai et al. ................ 310/215 |
| 6,741,009 | B1 | * | 5/2004  | Ando et al. ............... 310/254.1 |
| 6,806,614 | B2 | * | 10/2004 | Kuroyanagi et al. ....... 310/215 |
| 6,831,389 | B2 | * | 12/2004 | Takano et al. ............ 310/254.1 |
| 6,886,236 | B2 | * | 5/2005  | Higashino et al. ........... 29/596 |
| 7,579,735 | B2 | * | 8/2009  | Otsuji ......................... 310/194 |
| 2002/0195920 | A1 | * | 12/2002 | Furusawa et al. .......... 313/402 |
| 2003/0048022 | A1 | * | 3/2003  | Nagai et al. ................ 310/215 |
| 2003/0048023 | A1 | * | 3/2003  | Nagai et al. ................ 310/215 |
| 2005/0215413 | A1 | * | 9/2005  | Alkemper et al. ............ 501/54 |
| 2006/0022550 | A1 | * | 2/2006  | Otsuji ......................... 310/216 |
| 2006/0208603 | A1 | * | 9/2006  | Kerlin ......................... 310/261 |
| 2007/0133355 | A1 | * | 6/2007  | Hara et al. .................. 368/140 |

FOREIGN PATENT DOCUMENTS

| JP | 2-110979    | 9/1990 |
| JP | 2000-156951 | 6/2000 |
| JP | 2002-272048 | 9/2002 |
| JP | 2004-104870 | 4/2004 |
| JP | 2004-204695 | 7/2004 |

* cited by examiner

*Primary Examiner* — Quyen Leung
*Assistant Examiner* — Alex W Mok
(74) *Attorney, Agent, or Firm* — McGinn IP Law Group, PLLC (57) ABSTRACT

There are provided a tubular stator core having a plurality of tooth portions which protrude radially inwards and slots which are defined between the respective tooth portions and coils which are disposed on circumferences of the tooth portions. An insulator is attached to the stator core from an axial direction thereof for isolating the coils from the stator core. A radius of curvature of a corner portion of the insulator around which the coil is wound decreases continuously as the tooth portion extends from a root portion to a distal portion thereof.

16 Claims, 7 Drawing Sheets

A-A SECTIONAL VIEW

A-A SECTIONAL VIEW

FIG. 4A

B-B SECTIONAL VIEW

FIG. 4B

C-C SECTIONAL VIEW

MOTOR STATOR, MOTOR AND ELECTRIC PUMP UNIT

TECHNICAL FIELD

The present invention relates to a stator including a stator core around which coils are wound through an insulator, a motor having this stator, and an electric pump unit in which the motor and a pump part driven by the motor are made into a unit.

BACKGROUND ART

In motors such as brushless motors, in general, a rotor (a rotor) including magnets for generating magnetic fields rotates inside a stator (a stator) having coils (windings). This stator mainly includes a cylindrical stator core (a stator core) having a plurality of tooth portions (magnetic teeth) which protrude therefrom radially inwards and slots (iron core slots) which are defined between the adjacent tooth portions and coils which are disposed around the respective tooth portions. Here, an insulator made of a resin (an insulating material) is attached to the coils for isolating the coils from the stator core.

In a motor like this, there is a strong demand for an increase in space factor (winding density) of the coils in the stator in order to realize miniaturization and an increase in turning effort (response) of the motor, and coils turned as many as possible need to be disposed around the respective tooth portions.

Should an attempt be made to provide a coil in a multiplicity of layers on the circumference of each tooth portion through the insulator, however, a force comes to act more strongly which attempts to cause an upper coil to divide a lower coil. Namely, in this case, as is shown in FIG. 6A, a winding 13a of an upper layer forcibly squeezes itself between a winding 13a of a lower layer, and a force comes to act more conspicuously which attempts to forcibly open the winding 13a of the lower layer radially inwards and outwards of a stator 1'.

Figure 6A:
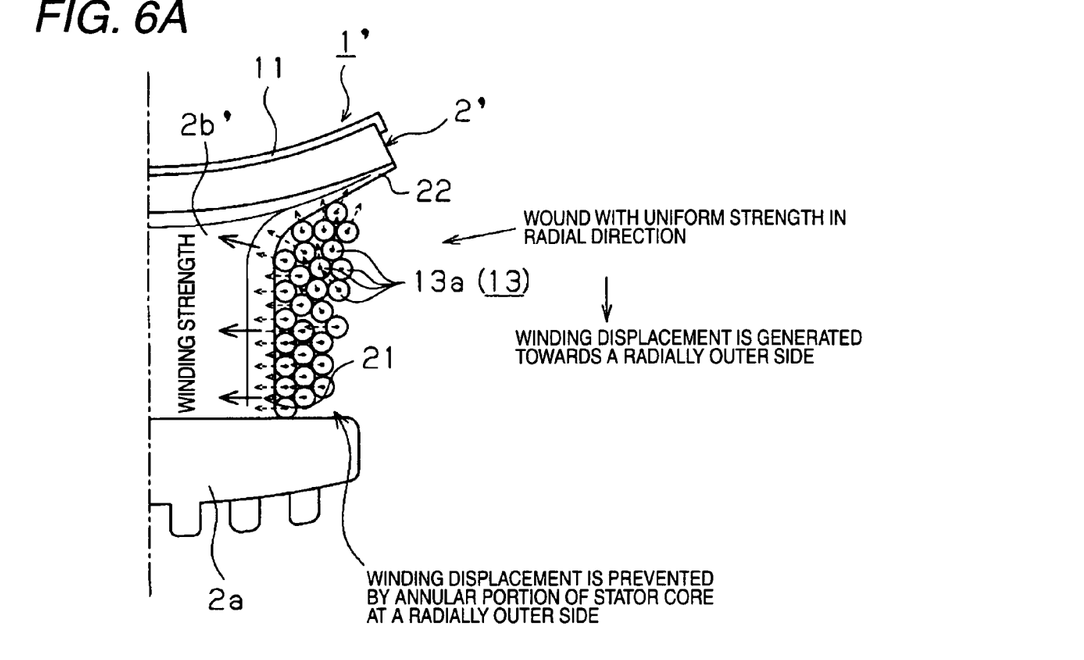
FIG. 6A is an exemplary diagram showing a state in which a winding displacement of a coil is generated in a tooth portion (a fitting portion of the insulator) of the stator.

As this occurs, as is shown in FIG. 6A, since an annular portion 2a of a stator core 2' exists radially outwards of the stator 1', a winding displacement of the coil 13 which is directed radially outwards is stopped by the annular portion 2a, and a winding displacement of the coil 13 is then generated to be directed radially inwards (the coil 13 comes to be wound thicker in the vicinity of a center of the stator core 2'). As a result, the proper arrangement of the winding is disturbed, and a dead space (a space in which the coil 13 does not exist) is formed in an interior of each slot 12 (refer to FIG. 1), which results in a reduction in space factor of the coil 13. As this occurs, as the winding 13a is wound in more layers, a squeezing amount of the winding 13a of the upper layer into the winding 13a of the lower layer becomes larger, and in conjunction with this, the winding displacement of the coil 13 directed in a radially inward direction of the stator 1 is also increased.

On the other hand, there has been known a technique in which the number of turns of a coil at a root portion of every other tooth portion is increased so as to cause the coil to have a swollen shape (refer to JP-A-2004-104870).

According to this technique, in order to increase the number of turns of the coil at the root portion of every other tooth portion so as to cause the coil to have the swollen shape, firstly, a winding coiling nozzle (needle) is inserted in advance within a slot so as to form a coil of winding on every other tooth portion, and the nozzle is turned in many times to wind the windings at the root portion side of the tooth portion so as to swell the coil. Thereafter, the nozzle is pulled out of the slot and is then operated to loop around an adjacent tooth portion in the vicinity of a slot entrance portion (an open slot). Then, by the winding being caused to slide along a tapered portion of the coil, the coil can be formed without inserting the nozzle into a deep portion of the slot.

Namely, according to the technique, a dead space necessary for insertion of the nozzle in the interior of the slot is made unnecessary, whereby the space factor of the coil is increased. In other words, the winding can be coiled on a tooth portion interposed between the alternate tooth portions at the slot entrance portion without interfering with the adjacent coil, and the interior of the slot including the deep portion thereof can be made effective use of as a coil forming area, thereby making it possible to increase the space factor in theory.

DISCLOSURE OF THE INVENTION

Problem that the Invention is to Solve

According to the technique, however, the winding needs to be coiled in many turns towards the slot entrance on the tooth portion interposed between the alternate tooth portions. Because of this, the coil of windings is inevitably constructed in a multiplicity of layers in the vicinity of the slot entrance, and as with the problem inherent in the general related art, the squeezing amount of the winding of an upper layer into the winding of a lower layer becomes larger on the radially inner side of the stator in association with the coiling of the winding. In addition, in association with the increase in squeezing amount, the amount of winding displacement of the coil directed radially inwards has to be increased. This amount of winding displacement of the coil is increased further when the winding is coiled with a stronger force in order to increase further the space factor. In addition, in order to cause the coil to have the swollen shape by increasing the number of turns of the coil at the root portion of every other tooth portion, the winding coiling method becomes complex, and there is caused an inconvenience of being unable to make use of the winding coiling method of the related art as it is.

The invention has been made with a view to solving the problem, and an object thereof is to provide a motor stator which prevents effectively a winding displacement of coils wound around the circumference of a stator core through an insulator and increases the space factor of the coils so formed as much as possible, a motor having the stator, and an electric pump unit which utilizes the motor.

Means for Solving the Problem

With a view to solving the problem, a gist of a first aspect of the invention resides in a motor stator core comprising a tubular stator core having a plurality of tooth portions which protrude radially inwards and coils which are provided on circumferences of the respective tooth portions, an insulator being attached to the stator core from an axial direction thereof for isolating the coils from the stator core, wherein a radius of curvature R of a corner portion of the insulator (the tooth portion) around which the coil is wound continuously decreases as the tooth portion extends from a root portion towards a distal end portion thereof.

According to the configuration, the radius of curvature R of the corner portion of the insulator around which the coil is wound continuously decreases as the tooth portion extends from the root portion towards the distal end portion thereof (increases continuously as the tooth portion extends from the distal end portion towards the root portion thereof). Because of this, a circumferential length of the insulator around which the coil is wound becomes longer towards a radially outer side of the stator, whereby the coil can be wound around the tooth portion through the insulator with a strong force. As a result, a winding displacement of the coil can be suppressed effectively which would otherwise take place due to the squeezing amount of a winding of an upper layer into a winding of a lower layer being increased at a radially inner side of the stator, thereby making it possible to enhance as much as possible the space factor of the coil in the stator.

A gist of a second aspect of the invention resides in the motor stator of the first aspect, wherein the radius of curvature R of the corner portion of the insulator continuously decreases so that assuming that a value at the root portion of each tooth portion is referred to as 100%, a value of the distal end portion of the tooth portion becomes a specific value ranging from 28% to 32%.

According to the configuration, since the radius of curvature R of the corner portion of the insulator continuously decreases so that assuming that the value at the root portion of each tooth portion is referred to as 100%, the value of the distal end portion of the tooth portion becomes the specific value ranging from 28% to 32%, a pair of ridges which are formed by a continuity of the corner portions in each tooth portion can be made into straight line shapes which extend substantially parallel to each other along a radial direction of the stator while securing the strength of the insulator.

A gist of a third aspect of the invention resides in the motor stator of the first or second aspect, wherein the radius of curvature R of the corner portion of the insulator decreases linearly.

According to the configuration, since the radius of curvature of the corner portion of the insulator decreases linearly, the design of a portion of the insulator which surrounds the tooth portion (a portion of the insulator which isolates the tooth portion from the coil) is facilitated, and the fabrication thereof is also simplified.

A gist of a fourth aspect of the invention resides in the motor stator of the first or second aspect, wherein the radius of curvature R of the corner portion of the insulator decreases in an upwardly salient curve-like fashion.

According to the configuration, since the radius of curvature R of the corner portion of the insulator decreases in the upwardly salient curve-like fashion, a difference in circumferential length over which the coil is wound between a radially outward portion and a radially inward portion of the stator is increased further, and the coil is wound round the tooth portion through the insulator with a stronger force at the radially outward portion than the radially inward portion of the tooth portion. As a result, the winding displacement of the coil can be suppressed more effectively.

A gist of a fifth aspect of the invention resides in a motor comprising a motor stator and a rotor which is disposed in such a manner as to be surrounded by tooth portions of the stator, wherein the motor stator is made up of the motor stator set forth in the first to fourth aspects.

According to the configuration, the space factor of the coils of the stator is increased. Because of this, a further reduction in size of the motor and an increase in turning effort (response) thereof can be realized.

A gist of a sixth aspect of the invention resides in an electric pump unit comprising a pump part having an outer rotor and an inner rotor which is made to mesh with the outer rotor for rotation so as to suck and discharge a fluid and a motor for driving the pump part via a rotor which rotatably supports the inner rotor, wherein the motor is made up of the motor of the fifth aspect.

According to the configuration, in the electric pump unit in which the pump part such as a trochoidal pump and the motor are made into a unit, since the motor set forth in claim 5 is used as the motor, the space factor of the coils on the stator of the motor is increased. Because of this, a further reduction in size of the motor and an increase in turning effort (response) thereof can be realized, and a reduction in size of the electric pump unit as a whole and an enhancement in performance thereof can be realized. These advantages become useful particularly when the electric pump unit is applied to a motor vehicle for which a reduction in size and enhancement in performance of components used are strongly demanded.

Advantage of the Invention

According to the motor stator of the invention, it becomes possible to prevent effectively the winding displacement of the coils which are wound round the stator core through the insulator and to increase the space factor of the coils as much as possible.

BEST MODE FOR CARRYING OUT THE INVENTION

Hereinafter, an embodiment which embodies the invention will be described according to the drawings.

Figure 1:
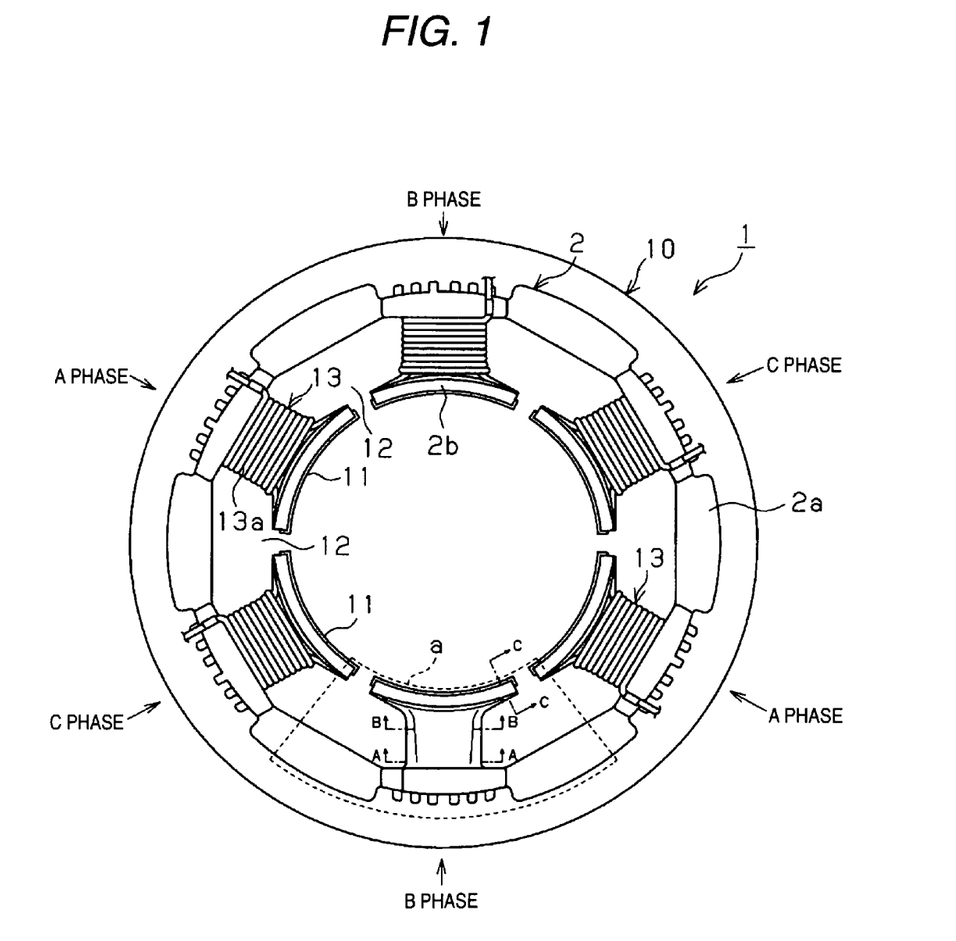
FIG. 1 is a plan view showing an overall configuration of a stator of an electric pump according to an embodiment of the invention.

A motor stator 1 according to the embodiment takes a cylindrical (tubular) form as a whole which is used in a brushless motor of a so-called three phase construction. As is shown in FIG. 1, the stator 1 includes a cylindrical (tubular) stator core 10 having six (a plurality of) tooth portions 11 (refer to FIG. 2) which protrude radially inwards and six (a plurality of) slots 12 which are defined between the tooth portions 11 and six (a plurality of) coils 13 which are provided on circumferences of the respective tooth portions 11. In the stator 1, each pair of coils 13 of the same phase (A phase, B phase, C phase) which confronts in a circumferential direction is formed by a single winding (a lead wire) which is covered by an insulating material such as enamel. In addition, although its illustration is omitted in FIG. 1, a cylindrical rotor 6 (a rotor, refer to FIG. 7) having N, S poles is disposed in a central portion of the stator 1 in such a manner as to be surrounded by the six tooth portions 11, whereby a motor is made up. In FIG. 1, for example, the coils 13, 13 which make up an A phase are formed by a single winding 13a being wound round circumferences of the tooth portions 11 which are surrounded by an insulator 2.

The stator 1 includes the cylindrical (tubular) insulator 2 which is attached to the stator core 10 from an axial direction thereof so as to isolate the respective coils 13 from the stator core 10. Specifically, as is shown in FIG. 2, the stator 1 is isolated from the respective coils 13 by a pair of insulators 2 being fitted thereon from both axial end sides thereof (the left and right of FIG. 1) (with only an upper insulator 2 shown in FIG. 1).

The insulator 2 is molded using an insulating resin material (an insulator) such as polyphenylene sulfide (PPS) which has superior resistance. In addition, as is shown in FIGS. 1 and 2, each insulator 2 includes an annular portion 2a which is provided on an end face of the stator core 10 and six (a plurality of) fitting portions 2b each having a substantially U-shaped cross section, which protrude radially inwards of the insulator 2 from the annular portion 2a and which are formed so as to fit, respectively, on the six tooth portions 11 of the stator core 10.

Figure 2:
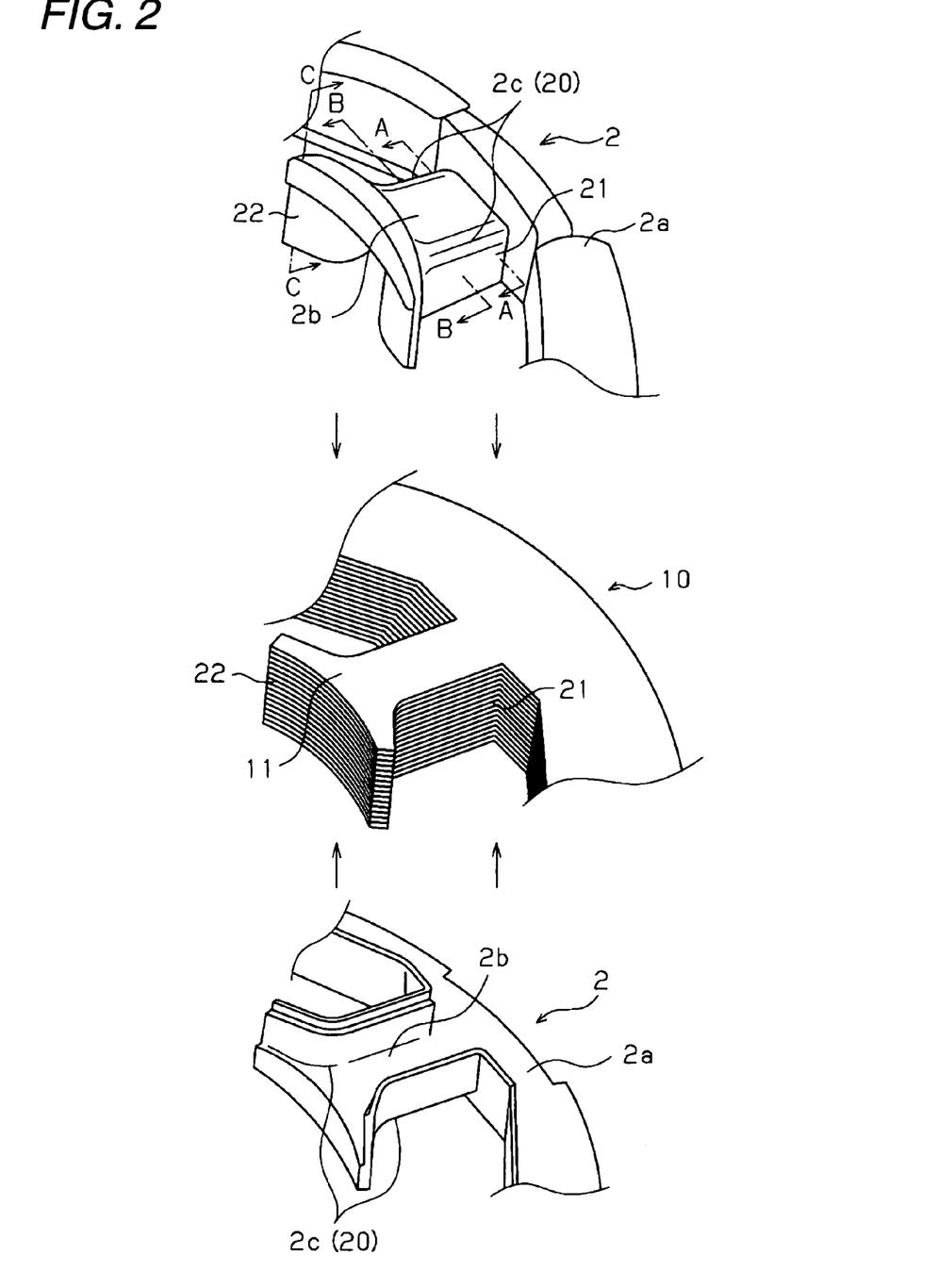
FIG. 2 is a perspective assembly diagram of an area a in FIG. 1 (with the coil omitted from the drawing).
Figure 3:
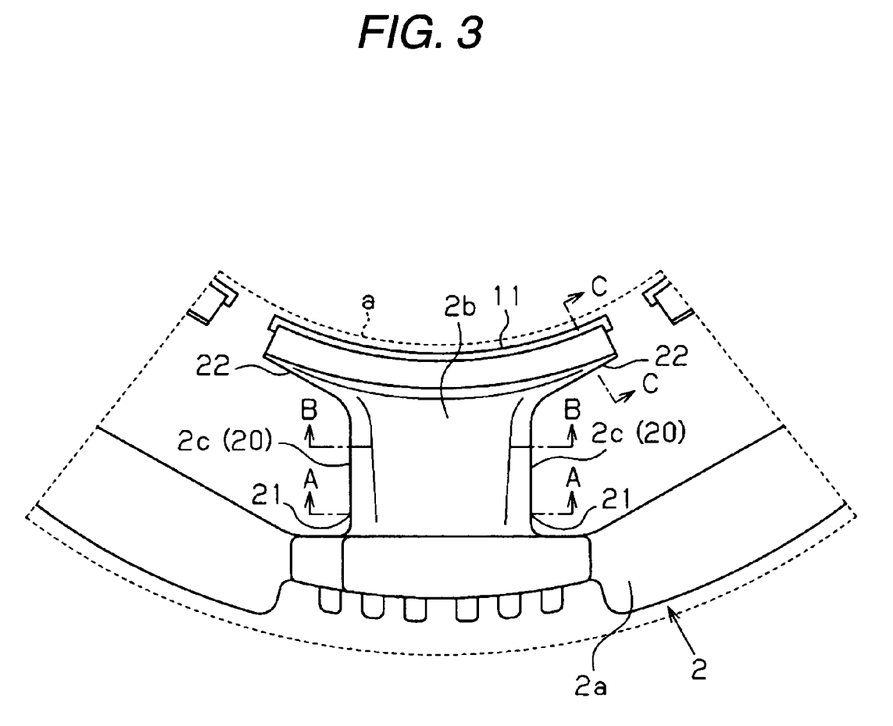
FIG. 3 is an enlarged plan view of the area a in FIG. 1.

Here, in each fitting portion 2b, as is shown in FIGS. 2 and 3, a pair of left and right straight-line ridges 20 is formed on a portion around which the coil 13 is wound. By the pair of ridges 20, 20 being made into substantially parallel straight line shapes which extend along a radial direction of the stator 1, the amount (winding density) of a winding 13a which is accommodated in each slot 12 (refer to FIG. 1) of the stator 1 can be increased.

In addition, as is shown in FIGS. 1 to 4, corner portions 2c (outwardly bent portions of the ridges 20 in cross section) at which the winding 13a which makes up the coil 13 is bent at about 90° are formed on the portion of the insulator 2 (the fitting portion 2b) around which the coil 13 is wound.

Figure 4A:
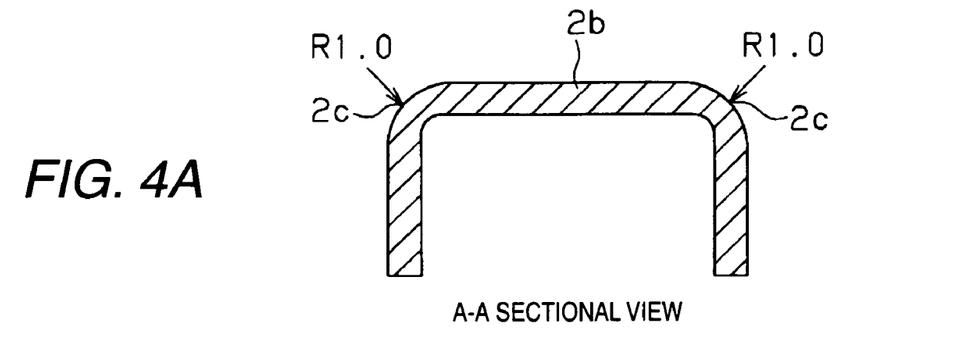
FIG. 4A is a sectional view taken along the line A-A in FIGS. 1 to 3.
Figure 4B:
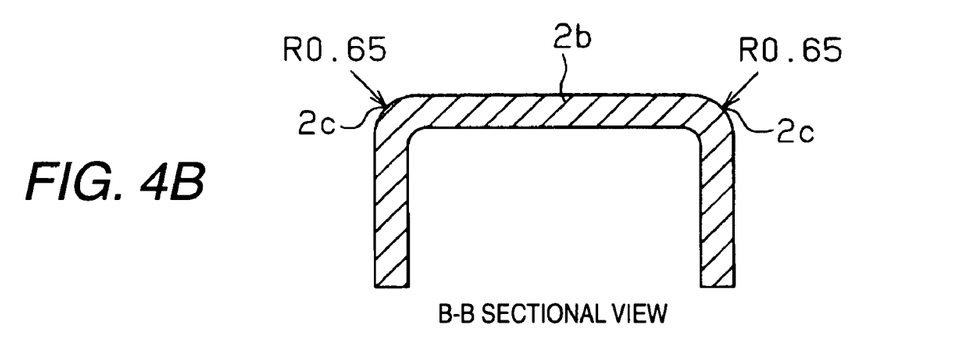
FIG. 4B is a sectional view taken along the line B-B in the same figures.
Figure 4C:
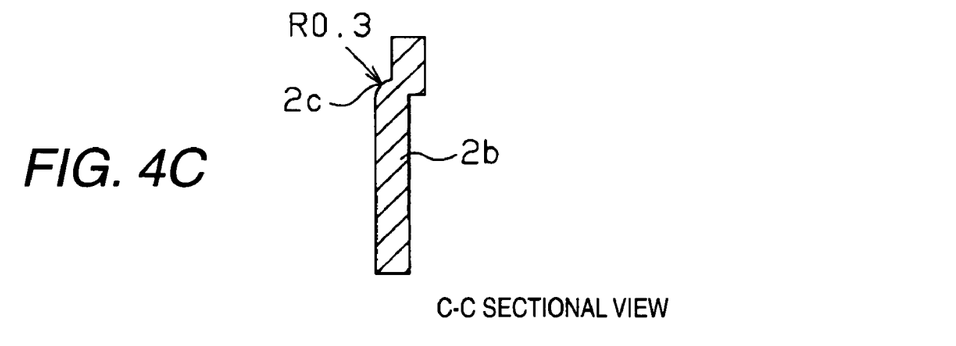
FIG. 4C is a sectional view taken along the line C-C in the same figures.
Figure 5:
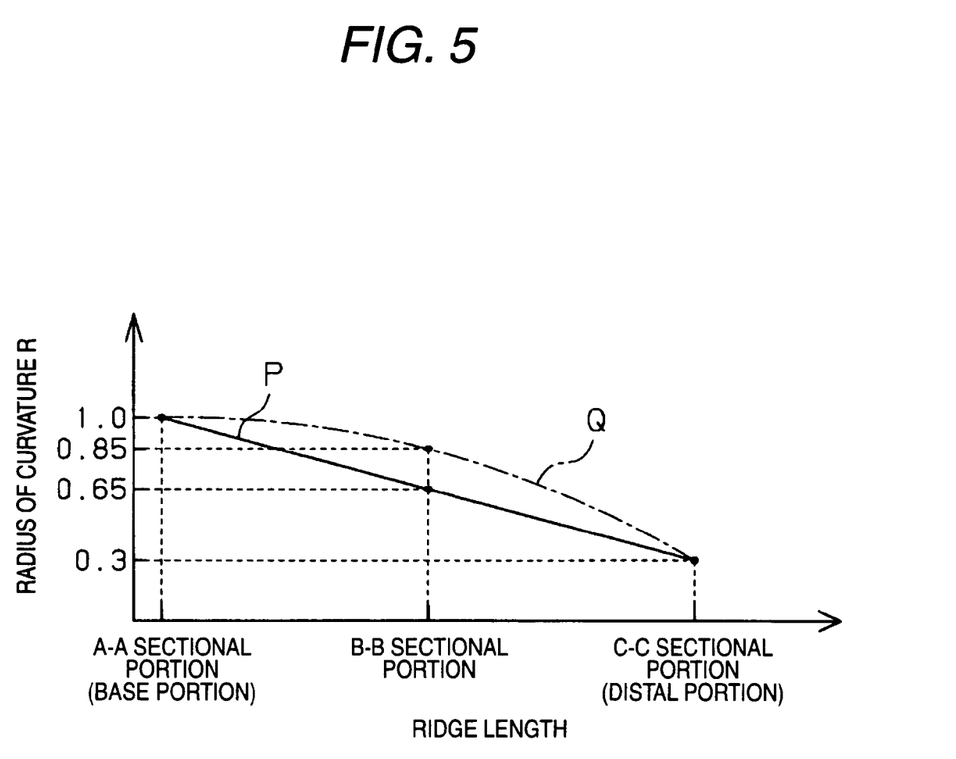
FIG. 5 is a graph showing a tendency of a radius of curvature R of a corner portion of an insulator changing along a ridge formed by the same corner portion.

The stator 1 according to the embodiment is characterized in that a radius of curvature R of the corner portion 2c decreases continuously (is made to change gradually so as to become smaller gradually) as the fitting portion 2b (the tooth portion 11) extends from a root portion 21 towards a distal end portion 22 thereof. To describe this in detail, the radius of curvature R of the corner portion 2c decreases continuously so that assuming that a value at the root portion 21 of the fitting portion 2b is referred to as 100%, a value of the distal end portion 22 becomes a specific value ranging from 28% to 32%. Specifically, in the embodiment, the thickness of the fitting portion 2b of the insulator 2 is of the order of 1.0 mm. In addition, as is shown in FIGS. 4A, 4B and 4C, the corner portions 2c of the fitting portion 2b around which the coil 13 is wound are formed in such a manner that the radius of curvature R becomes R=1.0 (corresponding to 100%) at an A-A cross section (a cross section of the distal end portion of the fitting portion 2b), R=0.65 (corresponding to 65%) at a B-B cross section (a cross section of a longitudinally central portion of the fitting portion 2b) and R=0.3 (corresponding to 30%) at a C-C cross section (a cross section of the distal end portion of the fitting portion 2b). Here, to describe the decreasing tendency of the radius of curvature R of the corner portion 2c of the aforesaid insulator by the use of FIG. 5, as is indicated by a solid line P in the same figure, the radius of curvature R decreases linearly along a length direction of the ridge 20 of the fitting portion 2b.

Figure 6B:
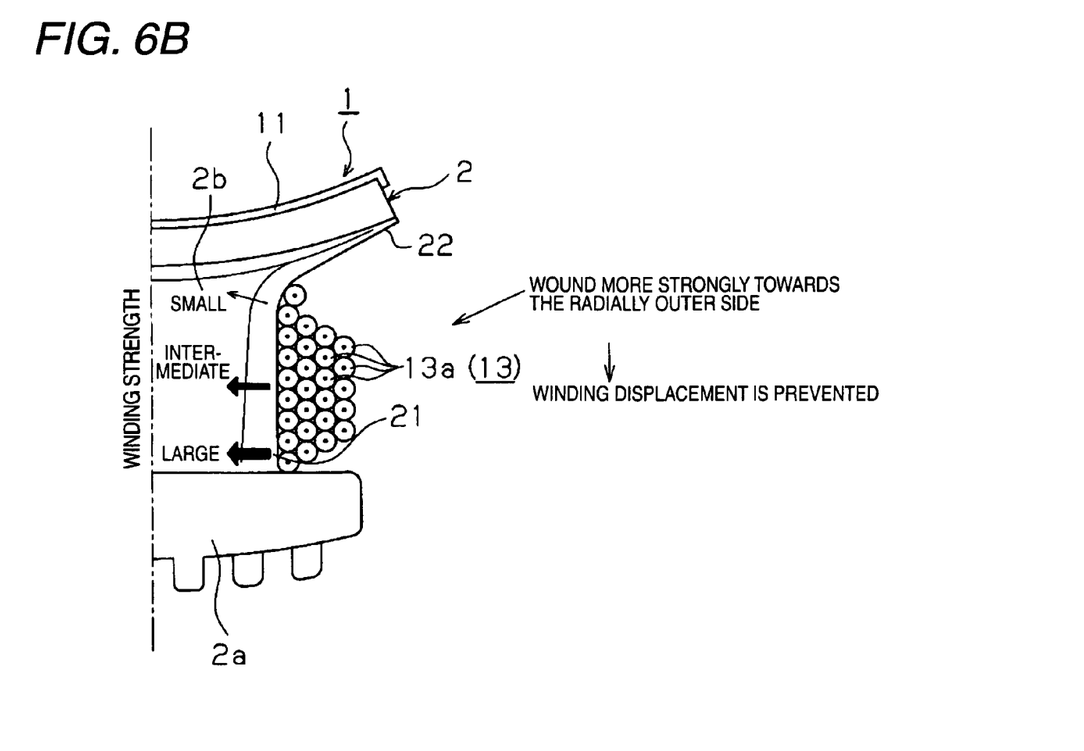
FIG. 6B is an exemplary diagram showing a state in which the winding displacement is suppressed.

According to the motor stator 1 of the embodiment, the following functions and advantages can be obtained. They are as follows;

(1) The radius of curvature R of the corner portion 2c of the insulator 2 (the fitting portion 2b) around which the coil 13 is wound decreases continuously as the tooth portion 11 (the fitting portion 2b) extends from the root portion 21 towards the distal end portion 22. Because of this, the circumferential length of the insulator 2 (the fitting portion 2b) around which the coil 13 is wound becomes longer towards the radially outer side of the stator 1, the coils 13 can be wound around the tooth portions through the respective fitting portions 2b of the insulator 2 with the strong force. As a result, although in the related art, as is shown in FIG. 6A, the winding displacement of the coil 13 is increased towards the radially inner side by the squeezing amount of the winding 13a of the upper layer into the winding 13a of the lower layer becoming larger towards the radially inner side of the stator 1', in the embodiment, the winding displacement of the coil 13 is suppressed effectively, whereby the space factor of the coil can be increased as much as possible. To describe this in detail, in the related art shown in FIG. 6A, the radius of curvature R of the corner portions 2.c of the insulator 2' around which the coil 13 was wound was uniform from the root portion 21 to the distal end portion of the fitting portion 2b'. Because of this, the circumferential length of the insulator 2' (the fitting portion 2b') around which the coil 13 was wound became uniform, and the force with which the coil 13 was wound around the insulator 2' could not be increased at the radially outer side of the stator 1'. Namely, since the coil 13 was wound around each fitting portion 2b' of the insulator 2' in the radial direction with the uniform strength, the winding displacement of the coil was generated towards the radially outer side of the stator 1' by the force with which the coil 13 of the upper layer attempted to divide the coil 13 of the lower layer. In the embodiment shown in FIG. 6B, however, as has been described above, since the circumferential length of the insulator 2 around which the coil 13 is wound becomes longer towards the radially outer side of the insulator 2, whereby the coil 13 can be wound around the tooth portion 11 through each fitting portion 2b with the strong force, the winding displacement of the coil is suppressed effectively. As a result, the space factor of the coils 13 of the stator 1 can be increased as much as possible.

(2) The radius of curvature R of the corner portions 2c of the insulator 2 continuously decreases so that assuming that the value at the root portion 21 of each tooth portion 11 (each fitting portion 2b) is referred to as 100%, the value of the distal end portion 22 of the tooth portion 11 becomes the specific value ranging from 28% to 32%. Because of this; the pair of ridges 20, 20 which are each formed by the continuity of the corner portion 2c in each tooth portion 2b can be made into the straight line shapes which extend substantially parallel to each other along the radial direction of the stator 1 while securing the strength of the insulator 2. By this configuration, not only can the amount (the winding density) of the winding accommodated in each slot 12 of the stator 1 be increased, but also by the configuration described above, the coils 13 can be wound around the tooth portions 11 through the insulator 2 with the strong force towards the radially outer side of the stator 1 in an ensured fashion. As a result, the winding displacement of the coil 13 can effectively be suppressed which would otherwise take place by the squeezing amount of the winding 13a of the upper layer into the winding 13a of the lower layer being increased towards the radially inner side of the stator 1, whereby the space factor of the coil 13 can be made maximum.

Since the radius of curvature R of the corner portions 2c of the insulator 2 decreases linearly, the design of the portion of the insulator 2 which surrounds the tooth portion 11 (the portion of the insulator 2 which isolates the tooth portion 11 from the coil 13), that is, each fitting portion 2b of the insulator 2 is facilitated, and the fabrication thereof is also simplified.

Figure 7:
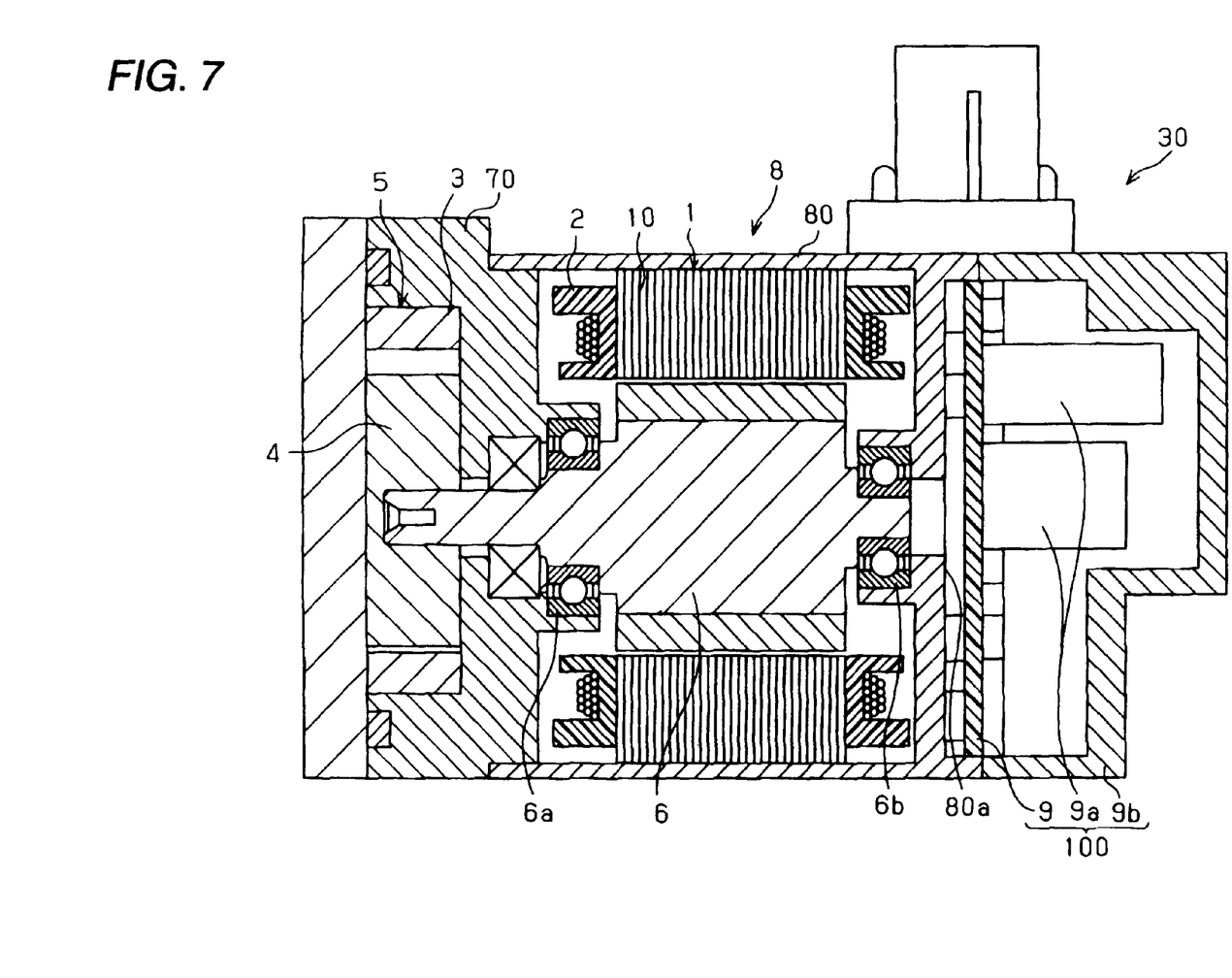
FIG. 7 is an axial sectional view showing an electric pump unit which is used in a source of hydraulic pressure in an automotive transmission.

The motor stator 1 of the embodiment can be applied to an electric pump unit 30 as is shown in FIG. 7 which is used as a source of hydraulic pressure in a transmission which is used when an idling stop is carried out on a motor vehicle. Namely, in an electric pump unit 30 comprising a trochoidal pump 5 (a pump part) having an outer rotor 3 and an inner rotor 4 which is made to mesh with the outer rotor 3 for rotation so as to suck and discharge a fluid and a motor 8 for driving the trochoidal pump 5 via a rotor 6 which rotatably supports the inner rotor 5, a stator which makes up the motor 8 can be made up of the motor stator 1 that has been described heretofore.

To describe this in detail, in the electric pump unit 30, as is shown in FIG. 7, the trochoidal pump 5 is housed in a pump housing 70 and is configured in such a manner as to have the outer rotor 3 which has trochoidal teeth and the inner rotor 4 which is made to mesh with the outer rotor 3 for rotation, so as to such and discharge a fluid such as oil. On the other hand, the motor 8 is housed in a motor housing 80 which is integrated with the pump housing 70 in such a manner as to communicate therewith and is configured in such a manner as to drive the trochoidal pump 5 via the rotor 6 which supports rotatably the inner rotor 4 and passes through the pump housing 70. In addition, this rotor 6 is supported rotatably relative to the pump housing 70 and the motor housing 80 through rolling bearings 6a, 6b at a pump side and a motor side thereof, respectively, in the electric pump unit 30. In addition, in this electric pump unit 30, a circuit board 9 for controlling the motor 8 is attached to the motor housing 80 by screws, not shown, from an outer end face 80a side of the motor housing 80. Additionally, this circuit board 9 is housed in a controller housing portion 9b together with electronic components 9 such as coils and capacitors placed on the circuit board 9, and a controller 100 of the electric pump unit 30 is made up of those respective members 9, 9a and 9b.

In the event that the motor stator 1 of the embodiment is applied to the electric pump unit 30 that has been described above, the following function and advantage can be obtained. They are as follows;

In the electric pump unit 30 in which the trochoidal pump 5 and the motor 8 are made into a unit, the space factor of the coils 13 of the stator 1 of the motor 8 can be increased. By this, a further reduction in size and increase in turning effort (response) of the motor 8 can be realized, thereby making it possible to realize a reduction in size and increase in performance of the electric pump unit as a whole. These advantages become useful particularly when the electric pump unit 30 is used so as to be applied to a motor vehicle for which a reduction in size and enhancement in performance of components used are strongly demanded.

Note that the embodiment may be modified as follows.

In the embodiment, the radius of curvature R of the corner portions 2c decreases linearly. However, the invention is not limited thereto, and hence, even in the event that the radius of curvature R decreases in an upwardly salient curve-like fashion (refer to an imaginary line Q in FIG. 5), such a modification is included in the technical concept of the invention.

According to the configuration, since the radius of curvature of the corner portions 2c of the insulator 2 decreases in the upwardly salient curve-like fashion, a difference in circumferential length of the insulator 2 (the fitting portion 2b) around which the coil 13 is wound at the radially inner side and the radially outer side of the stator 1 is increased, whereby the coil 13 can be wound around the tooth portion 11 through the insulator 2 with the strong force towards the radially outer side of the stator 1. As a result, the winding displacement of the coil 13 can effectively be suppressed which would otherwise take place due to the squeezing amount of the winding 13a of the upper layer into the winding 13a of the lower layer being increased at the radially inner side of the stator 1, thereby making it possible to increase the space factor of the coils 13 of the stator 1 as much as possible.

In the embodiment, the radius of curvature R of the corner portions 2c of the insulator 2 is made to decrease symmetrically and continuously on the left- and right-hand (the pair of ridges 20, 20) sides in the width direction. However, the invention is not limited thereto, and hence, even in the event that the radius of curvature decreases asymmetrically on the left- and right-hand sides, as long as such a modification still provides the same function and advantage as those of the embodiment, the modification is, of course, included in the technical concept of the invention.

The invention claimed is:

1. A motor stator, comprising:
   a tubular stator core including a plurality of tooth portions which protrude radially inwards;
   an insulator attached to the stator core in an axial direction of the stator core; and
   coils which are wound around portions of the insulator which correspond to respective tooth portions in such a state that the coils are isolated from the stator core by the insulator,
   wherein a radius of curvature R of a corner portion of the insulator around which the coil is wound continuously decreases as a tooth portion of the tooth portions extends from a root portion, which is connected stator core to an other tooth portion of the tooth portions, towards a distal end portion of said tooth portion.

2. The motor stator according to claim 1, wherein the radius of curvature R of the corner portion of the insulator continuously decreases so that assuming that a value of R at the root portion of each tooth portion is referred to as 100%, the value of R at the distal end portion of the tooth portion becomes a specific value ranging from 28% to 32%.

3. The motor stator according to claim 2, wherein the radius of curvature R of the corner portion of the insulator decreases linearly.

4. The motor stator according to claim 2, wherein the radius of curvature R of the corner portion of the insulator decreases in an upwardly salient curve-like fashion.

5. A motor, comprising:
   the motor stator according to claim 2; and
   a rotor which is disposed in such a manner as to be surrounded by the tooth portions of the stator.

6. The motor stator according to claim 1, wherein the radius of curvature R of the corner portion of the insulator decreases linearly.

7. A motor, comprising:
   the motor stator according to claim 6; and
   a rotor which is disposed in such a manner as to be surrounded by the tooth portions of the stator.

8. The motor stator according to claim 1, wherein the radius of curvature R of the corner portion of the insulator decreases in an upwardly salient curve-like fashion.

9. A motor, comprising:
the motor stator according to claim 8; and
a rotor which is disposed in such a manner as to be surrounded by the tooth portions of the stator.

10. A motor, comprising:
the motor stator according to claim 1; and
a rotor which is disposed in such a manner as to be surrounded by the tooth portions of the stator.

11. An electric pump unit, comprising:
a pump part including an outer rotor and an inner rotor which is made to mesh with the outer rotor for rotation so as to suck and discharge a fluid; and
the motor according to claim 10 for driving the pump part via a rotor which rotatably supports the inner rotor.

12. The motor stator according to claim 1, wherein the distal end of said tooth portion is unattached to a distal end of said other tooth portion.

13. The motor stator according to claim 12, wherein the radius of curvature R of the corner portion of the insulator continuously decreases in a radial direction from the tubular stator core towards the distal end portion.

14. The motor stator according to claim 1, wherein the insulator comprises a pair of ridges formed on a portion around which the coil is wound.

15. The motor stator according to claim 14, wherein the pair of ridges has straight-line shapes which extend along a radial direction of the stator.

16. The motor stator according to claim 14, wherein a ridge of the pair of ridges extends substantially parallel to an other ridge of the pair of the ridges along a radial direction of the stator.

* * * * *